(12) United States Patent
Xiong et al.

(10) Patent No.: US 10,556,352 B2
(45) Date of Patent: Feb. 11, 2020

(54) WAIST ROTATION STRUCTURE AND ROBOT

(71) Applicant: UBTECH Robotics Corp., Shenzhen (CN)

(72) Inventors: Youjun Xiong, Shenzhen (CN); Wenquan Shu, Shenzhen (CN); Wenhua Yu, Shenzhen (CN); Qi Zhao, Shenzhen (CN); Libing Zhou, Shenzhen (CN); Youpeng Li, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 373 days.

(21) Appl. No.: 15/609,026

(22) Filed: May 31, 2017

(65) Prior Publication Data

US 2018/0187757 A1 Jul. 5, 2018

(30) Foreign Application Priority Data

Dec. 30, 2016 (CN) .......................... 2016 1 1250909

(51) Int. Cl.
*B25J 19/00* (2006.01)
*B25J 17/00* (2006.01)

(52) U.S. Cl.
CPC ........... *B25J 17/00* (2013.01); *B25J 19/0029* (2013.01)

(58) Field of Classification Search
CPC . B25J 19/0029; B25J 17/0241; B25J 19/0041
See application file for complete search history.

(56) References Cited

U.S. PATENT DOCUMENTS

| 4,840,090 | A | * | 6/1989 | Iwata | ..................... | B25J 9/1025 |
| | | | | | | 74/640 |
| 4,922,755 | A | * | 5/1990 | Oshiro | ..................... | B25J 9/102 |
| | | | | | | 74/490.03 |
| 5,669,269 | A | * | 9/1997 | Katamine | ................ | B25J 9/102 |
| | | | | | | 74/490.02 |
| 5,712,552 | A | * | 1/1998 | Hirai | .................... | B25J 19/0029 |
| | | | | | | 318/568.1 |
| 7,762,825 | B2 | * | 7/2010 | Burbank | .............. | B25J 19/0029 |
| | | | | | | 439/247 |
| 7,942,779 | B2 | * | 5/2011 | Kobayashi | ............. | B25J 9/0009 |
| | | | | | | 475/149 |
| 9,254,574 | B2 | * | 2/2016 | Long | ........................ | B25J 9/102 |
| 9,346,174 | B2 | * | 5/2016 | Adachi | ................ | B25J 19/0029 |

(Continued)

*Primary Examiner* — William Kelleher
*Assistant Examiner* — Gregory T Prather

(57) ABSTRACT

A waist rotation structure includes a mounting disc defining a through hole, a rotatable disc located at a first side of the mounting disc, a driving device fixed to a second side of the mounting disc that is opposite the first side, and a transmission assembly. The rotatable disc defines a first cable insertion hole. The driving device includes an output shaft. The transmission assembly includes a drive gear connected to the output shaft, and a transmission cylinder extending through the through hole. The transmission cylinder includes a body that extends through the through hole, and is rotatably connected to the mounting disc and fixedly connected to the rotatable disc, and a driven gear arranged on a lateral surface of the body and engaged with the drive gear. The body defines a wiring hole extending opposite ends thereof and aligning with the first cable insertion hole.

18 Claims, 6 Drawing Sheets

(56) References Cited

U.S. PATENT DOCUMENTS

| | | | |
|---|---|---|---|
| 2002/0066331 A1* | 6/2002 | Okada | B25J 9/102 74/490.03 |
| 2009/0124446 A1* | 5/2009 | Miyoshi | B25J 9/102 475/163 |
| 2012/0313461 A1* | 12/2012 | Takeuchi | H02K 1/278 310/43 |
| 2017/0282382 A1* | 10/2017 | Inoue | B25J 9/102 |
| 2019/0160694 A1* | 5/2019 | Inoue | B25J 17/0241 |

* cited by examiner

WAIST ROTATION STRUCTURE AND ROBOT

CROSS REFERENCE TO RELATED APPLICATIONS

This application claims priority to Chinese Patent Application No. 201611250909.8, filed Dec. 30, 2016, which is hereby incorporated by reference herein as if set forth in its entirety.

BACKGROUND

1. Technical Field

The present disclosure generally relates to the field of robotics, and particularly to a waist rotation structure and a robot.

2. Description of Related Art

A waist rotation structure is used to connect the upper torso and the lower torso of a robot, such as a humanoid robot. In some conventional robots, components for creating the electrical connection between the upper and the lower torsos of the robot are arranged at the waist rotation structure, causing the electrical connection structure at the waist rotation structure to be complicated.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
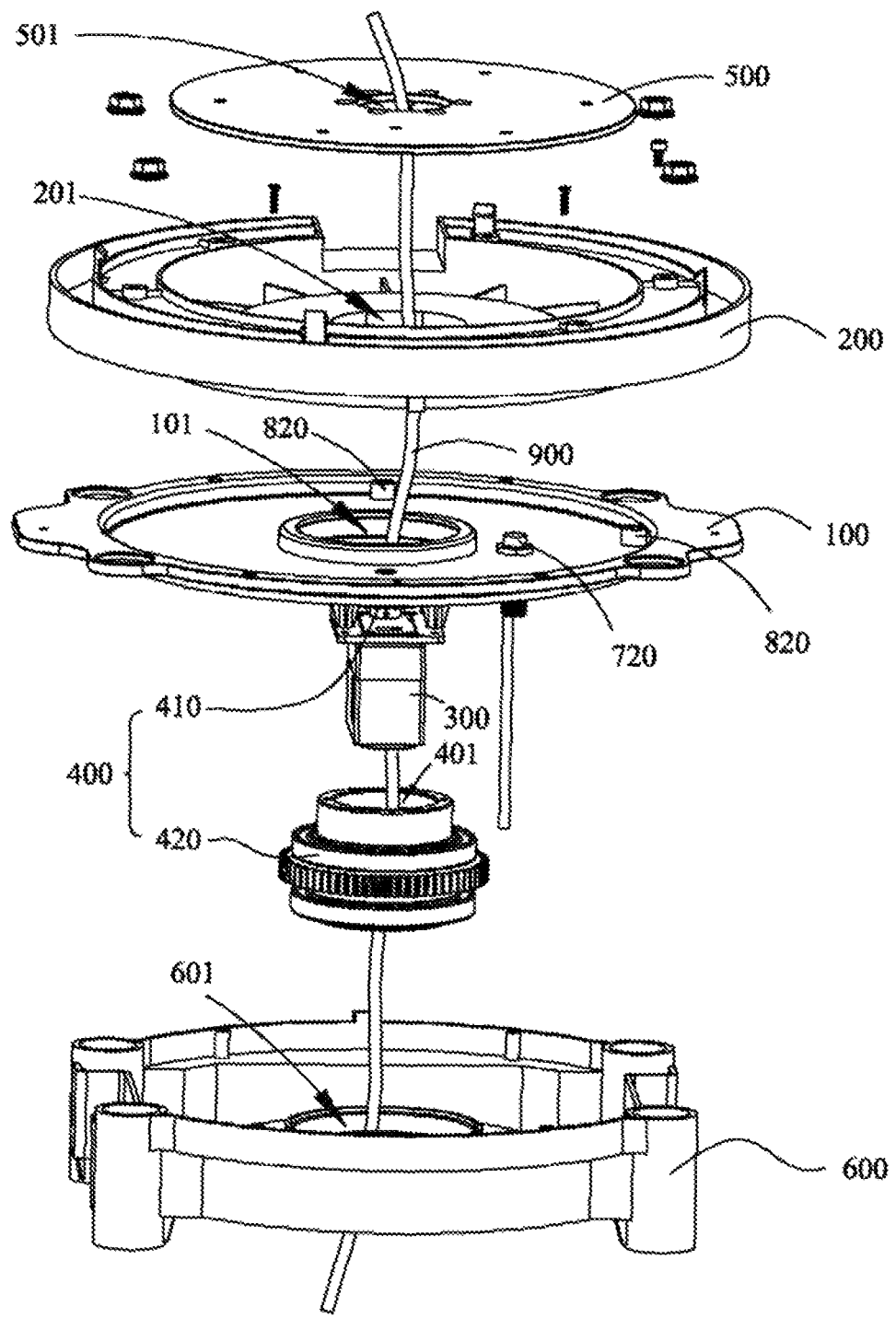
FIG. 1 is an isometric exploded view of a waist rotation structure according to one embodiment.
Figure 2:
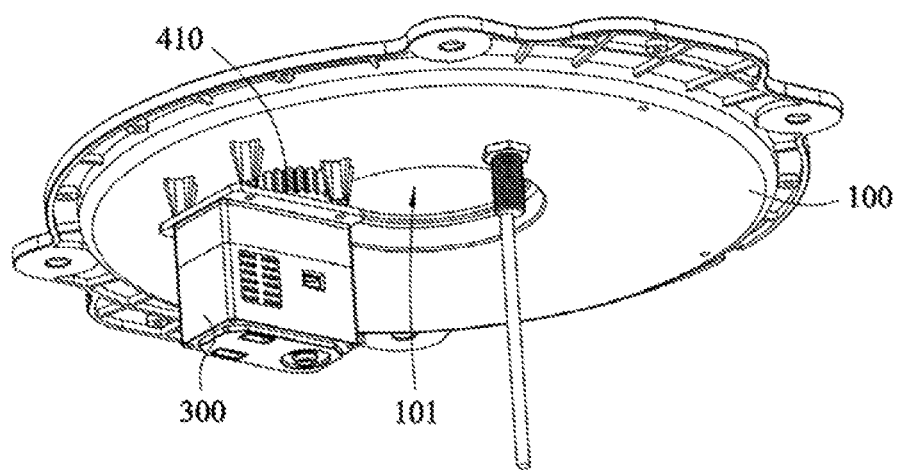
FIG. 2 is an isometric view of a sub-assembly of the waist rotation structure of FIG. 1 showing a mounting disc, a driving device and an initial position sensor.
Figure 3:
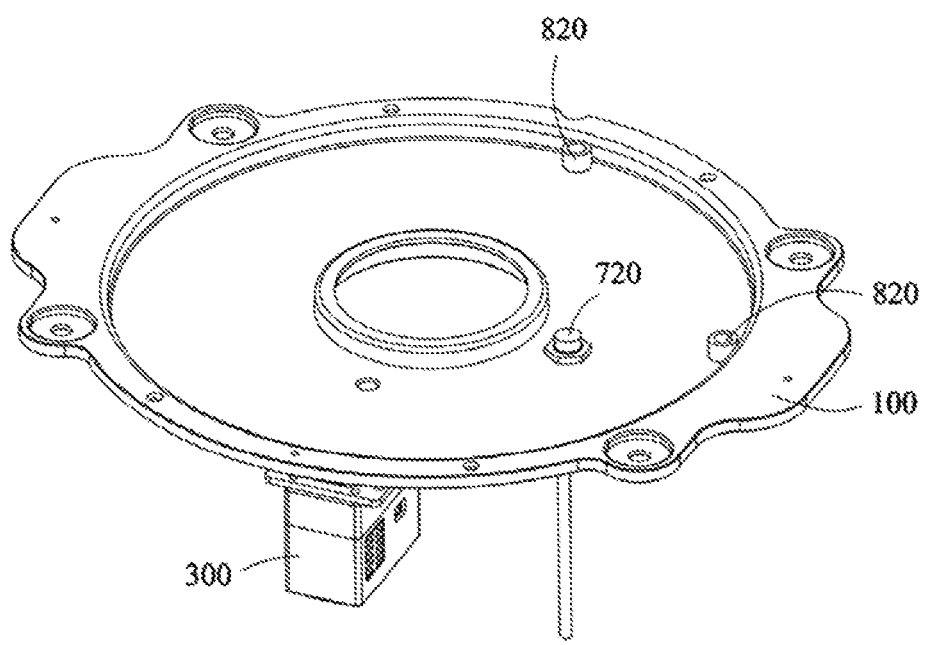
FIG. 3 is an isometric view of the sub-assembly of FIG. 2, viewed from another aspect.
Figure 4:
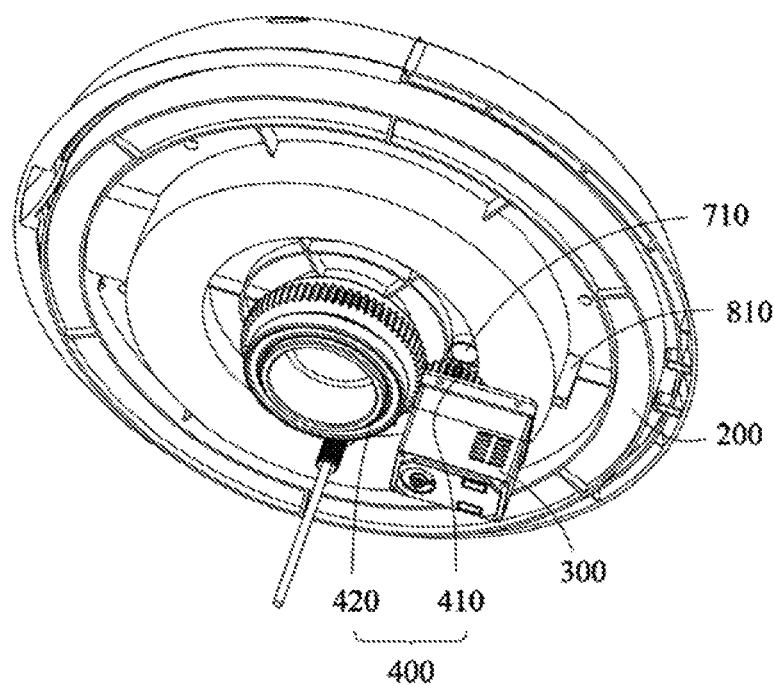
FIG. 4 is an isometric view of a sub-assembly of the waist rotation structure of FIG. 1 showing a rotatable disc, a driving device and a transmission assembly.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The embodiment of the present disclosure provides a waist rotation structure which can be mounted to a leg structure of a robot or a chest structure of a robot.

Referring to FIGS. 1-4, the waist rotation structure includes a mounting disc 100, a rotatable disc 200 located at a first side of the mounting disc 100, a driving device 300 fixed to a second side the mounting disc 100 that is opposite the first side, and a transmission assembly 400. The driving device 300 is a servo. The mounting disc 100 defines as through hole 101. The transmission assembly 400 includes a drive gear 410 connected to the output shaft of the driving device 300, and a transmission cylinder 420 extending through the through hole 101. The transmission cylinder 420 includes a body 421 that extends through the through hole 101, and is rotatably connected to the mounting disc 100 and fixedly connected to the rotatable disc 200, and a driven gear 422 arranged on a lateral surface of the body 42 and engaged with the drive gear 410. The rotatable disc 200 defines a first cable insertion hole 201. The body 421 defines a wiring hole 401 extending opposite ends thereof and a aligning with the first cable insertion hole 201.

The waist rotation structure of the present embodiment defines the wiring hole 401 and the first cable insertion hole 201 so that the wires/cables 900 can pass through the waist rotation structure from one side to the other opposite side, thereby ensuring that the upper torso and the lower torso of the robot are rotatable with respect to each other, and simplifying the electrical connection structure of the waist rotation structure. Specifically, when the driving device 300 is operated, the output shaft of the driving device 300 is rotated. Since the drive gear 410 is connected to the output shaft, the drive gear 410 is rotated together with the output shaft, and since the drive gear 410 is engaged with the driven gear 422, the driven gear 422 will also rotate together with the drive gear 410, thereby causing the body 421 and the rotatable disc 200 to rotate.

Figure 5:
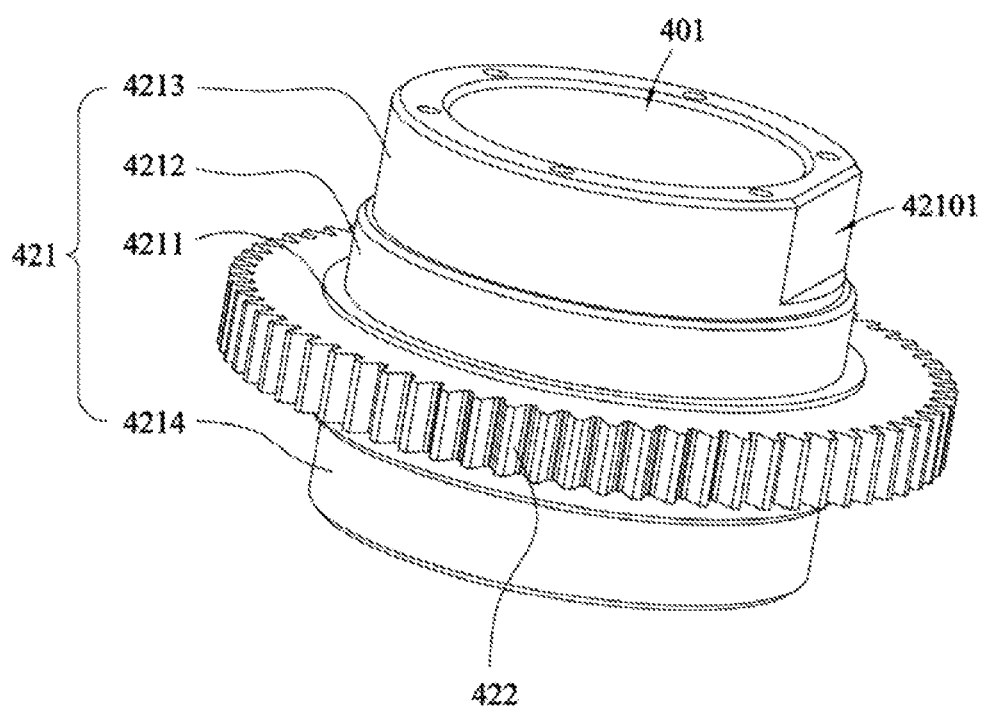
FIG. 5 is an isometric view of a transmission cylinder of the waist rotation structure of FIG. 1.

Referring to FIG. 5, the body 421 includes a gear section 4211, mounting section 4212 and a transmission section 4213 that are connected in sequence along a length-wise direction of the first cable insertion hole 201. The gear section 4211 and the driven gear 422 are integrally formed. The gear section 4211, the mounting section 4212 and the transmission section 4213 are integrally formed, which enhances the strength of the mechanical connection between the gear section 211, the mounting section 4212 and the transmission section 4213, and facilitates the improvement of production efficiency. In the embodiment, the mounting section 4212 is rotatably connected to the mounting disc 100 by a first bearing at the through hole 101. In this way, the connection between the mounting section 4212 and the mounting disc 100 is realized by the first bearing. Bearings are a mature technology, which has been standardized and serialized. It can ensure a stable and good connection between the mounting section 4212 and the mounting disc 100 by connecting the mounting section 4212 and the mounting disc 100 via a suitable bearing. The transmission section 4213 is fixedly connected to the rotatable disc 200 so as to ensure that the rotatable disc 200 will rotate together with the body 421.

Referring to FIGS. 1 and 5, the transmission section 4213 is inserted in the first cable insertion hole 201. A lateral surface of the transmission section 4213 includes a first positioning surface 42101, and a lateral surface of the first cable insertion hole 201 includes a second positioning surface (not shown) matching the first positioning surface 42101. With such configuration, the engagement between the positioning surface 42101 and the positioning surface of the first cable insertion hole 201 prevents the rotatable disc 200 from rotating with respect to the transmission section 4213, thereby preventing the rotatable disc 200 from rotating with respect to the driven gear 422.

Referring to FIG. 1, the waist rotation structure further includes an auxiliary disc 500. The auxiliary disc 500 defines a second cable insertion hole 501 aligning with the through hole 101, and is fixedly connected to the transmission section 4213. With such configuration, the movement of the rotatable disc 200 and the transmission section 4213 in the axial direction is restricted by the auxiliary disc 500. In conjunction with the connection relationship between the rotatable disc 200 and the transmission section 4213, that is, the transmission section 4213 is inserted in the through hole 201, the rotatable disc 200 are fixedly connected to the transmission section 4213. In addition, it is ensured that wires/cables 900 can pass through the waist rotation structure from one side to the other opposite side by the arrangement of the second cable insertion hole 501 in the auxiliary disc 500.

In one embodiment, the auxiliary disc 500 is detachably connected to the gear section 4211 by screws on the end face of the transmission section 4213 away from the gear section 4211.

Referring to FIGS. 1-6, the waist rotation structure further includes an auxiliary support 600 fixedly connected to the mounting disc 100. The auxiliary support 600 and the mounting disc 100 corporately define a receiving chamber therebetween, The driving device 300 is received in the receiving chamber. The auxiliary support 600 defines a limitation groove 602 that, allows the driving device 300 to pass therethrough and prevents the driving device 300 from moving. It can prevent the driving device 300 from rotating due to the interaction force between the driven gear 422 and the drive gear 410 by the limitation groove 602. The receiving chamber may also accommodate other electronic components, such as batteries, according to need.

Figure 6:
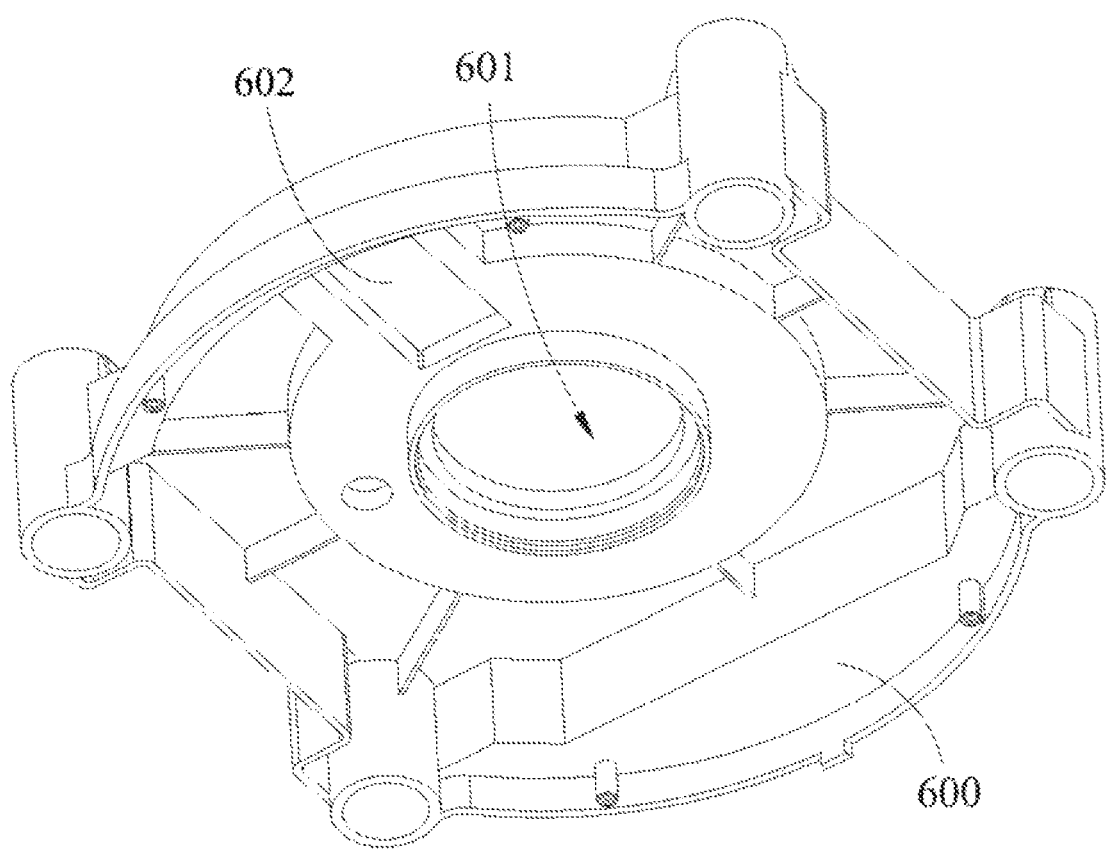
FIG. 6 is an isometric view of an auxiliary support of the waist rotation structure of FIG. 1.

Referring to FIGS. 1 and 6, the auxiliary support 600 defines a positioning hole 601. The body 421 further in an auxiliary section 4214 that is integrally thrilled with the gear section 4211 and passes through the positioning hole 601 and rotatably connected to the auxiliary support 600. The auxiliary section 4214 is connected to the auxiliary support 600 through a second bearing at said positioning hole 601. With such configuration, the body 421 has two rotational support positions at the mounting section 4212 and the auxiliary section 4214, which can avoid the position deviation of the body 421 during rotation and improve the stability of the body 421 during rotation. In addition, since the two rotational support positions are respectively located at opposite sides of the driven gear 422, the mounting section 4212 and the auxiliary section 4214 are subjected to substantially the same three when the drive gear 410 applies a force to the driven gear 422, which can avoid the position deviation of the body 421 during rotation and improve the stability of the body 421 during rotation.

Referring to FIGS. 1-4, the waist rotation structure further includes an initial position marking assembly for marking an initial position of the rotatable disc 200. The initial position marking assembly includes a metal block 710 arranged on a side of the rotatable disc 200 that faces the mounting disc 100, and a sensor 720 arranged on a side of the mounting disc 100 that faces the rotatable disc 200. The sensor 720 is used to detect a presence of the metal block 710 when the metal block 710 rotates together with the rotatable disc 200 to a predetermined position. Thus, the waist rotation structure can determine if the rotary disk 200 has returned to the initial position through the initial position marking assembly.

The position sensor 720 may be connected to a prompting module, or a display or the like that can provide a prompt to a user.

Referring t FIGS. 1-4, the waist rotation structure further includes a stopper assembly. The stopper assembly includes a stopper 810 arranged on a side of the rotatable disc 200 that faces the mounting disc 100, and two posts 820 arranged on a side of the mounting disc 100 that faces the rotatable disc 200. The two posts 820 are located on a movement path of the stopper 810, and are spaced apart from each other. With such configuration, the stopper 810 can only move between the two limit posts 820, thus preventing the rotatable disc 200 from rotating in the same direction, so as to avoid the tangling of the wires/cables 900.

In one embodiment, the stopper 810 and the rotatable disc 200 are integrally formed. The two posts 820 and the mounting disc 100 are integrally formed.

In one embodiment, the ratio of the number of teeth of the driven gear 422 to the number of teeth of the drive gear 410 is greater than one. Since the number of the teeth of the driven gear 422 is greater than the number of the teeth of the drive gear 410, when the driving gear 410 has rotated for one revolution, the driven gear 42 has not rotated for one revolution, thus increasing the transmission ratio of the transmission assembly 400, and increasing the output torque of the driving device 300. In the embodiment, the ratio of the number of teeth of the driven gear 422 to the number of teeth of the drive gear 410 is 3.

The present disclosure further provides a robot that includes a waist rotation structure of any one of the above embodiments, which not be repeated here.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A waist rotation structure comprising:
    a mounting disc defining a through hole,
    a rotatable disc located at a first side of the mounting disc, the rotatable disc defining a first cable insertion hole;
    a driving device fixed to a second side of the mounting disc that is opposite the first side, the driving device comprising an output shaft; and
    a transmission assembly comprising a drive gear connected to the output shaft, and a transmission cylinder extending through the through hole, the transmission cylinder comprising a body that extends through the through hole, and is rotatably connected to the mounting disc and fixedly connected to the rotatable disc, and a driven gear arranged on a lateral surface of the body and engaged with the drive gear, and the body defining a wiring hole extending opposite ends thereof and aligning with the first cable insertion hole,
    wherein the waist rotation structure further comprises a stopper assembly, the stopper assembly comprising a stopper arranged on a side of the rotatable disc that faces the mounting disc, and two posts arranged on a side of the mounting disc that faces the rotatable disc, and the two posts being located on a movement path of the stopper, and being spaced apart from each other.

2. The waist rotation structure of claim 1, wherein the body comprises a gear section, a mounting section and a transmission section that are connected in sequence along a length-wise direction of the first cable insertion hole, the gear section and the driven gear are integrally formed, the mounting section is rotatably connected to the mounting disc by a first bearing at the through hole, and the transmission section is fixedly connected to the rotatable disc.

3. The waist rotation structure of claim 2, wherein the transmission section is inserted in the first cable insertion hole, a lateral surface of the transmission section comprising a first positioning surface, and a lateral surface of the first cable insertion hole comprising a second positioning surface matching the first positioning surface.

4. The waist rotation structure of claim 3 further comprising an auxiliary disc, wherein the auxiliary disc defines a second cable insertion hole aligning with the through hole, and is fixedly connected to the transmission section.

5. The waist rotation structure of claim 2 further comprising an auxiliary support fixedly connected to the mounting disc, wherein the auxiliary support and the mounting disc corporately define a receiving chamber therebetween, the driving device is received in the receiving chamber, and the auxiliary support defines a limitation groove that allows the driving device to pass therethrough and prevents the driving device from moving.

6. The waist rotation structure of claim 5, wherein the auxiliary support defines a positioning hole, the body further comprises an auxiliary section that is integrally formed with the gear section and passes through the positioning hole and rotatably connected to the auxiliary support, the auxiliary section is connected to the auxiliary support through a second bearing at said positioning hole.

7. The waist rotation structure of claim 1 further comprising an initial position marking assembly for marking an initial position of the rotatable disc, wherein the initial position marking assembly comprises a metal block arranged on a side of the rotatable disc that faces the mounting disc, and a sensor arranged on a side of the mounting disc that faces the rotatable disc, the sensor is configured to detect a presence of the metal block when the metal block rotates together with the rotatable disc to a predetermined position.

8. The waist rotation structure of claim 1, wherein a ratio of a number of teeth of the driven gear to a number of teeth of the drive gear is greater than one.

9. A robot comprising a waist rotation structure, the waist rotation structure comprising:
a mounting disc defining a through hole,
a rotatable disc located at a first side of the mounting disc, the rotatable disc defining a first cable insertion hole;
a driving device fixed to a second side of the mounting disc that is opposite the first side, the driving device comprising an output shaft; and
a transmission assembly comprising a drive gear connected to the output shaft, and a transmission cylinder extending through the through hole, the transmission cylinder comprises a body that extends through the through hole, and is rotatably connected to the mounting disc and fixedly connected to the rotatable disc, and a driven gear arranged on a lateral surface of the body and engaged with the drive gear, and the body defines a wiring hole extending opposite ends thereof and aligning with the first cable insertion hole,
wherein the waist rotation structure further comprises a stopper assembly, the stopper assembly comprising a stopper arranged on a side of the rotatable disc that faces the mounting disc, and two posts arranged on a side of the mounting disc that faces the rotatable disc, and the two posts being located on a movement path of the stopper, and being spaced apart from each other.

10. A waist rotation structure comprising:
a mounting disc defining a through hole,
a rotatable disc defining a first cable insertion hole;
a driving device fixed to the mounting disc and spaced from the rotatable disc by the mounting disc, the driving device comprising an output shaft; and
a transmission assembly comprising a drive gear connected to the output shaft, and a transmission cylinder extending through the through hole, the transmission cylinder comprising a body that extends through the through hole, and is rotatably connected to the mounting disc and fixedly connected to the rotatable disc, and a driven gear fixedly arranged on a lateral surface of the body and engaged with the drive gear, the driven gear being rotatable with respect to the mounting disc, and the body defining a wiring hole extending opposite ends thereof and aligning with the first cable insertion hole,
wherein the mounting disc is stationary with respect to the driving device upon a rotation of the transmission assembly.

11. The waist rotation structure of claim 10, wherein the body comprises a gear section, a mounting section and a transmission section that are connected in sequence along a length-wise direction of the first cable insertion hole, the gear section and the driven gear are integrally formed, the mounting section is rotatably connected to the mounting disc by a first bearing at the through hole, and the transmission section is fixedly connected to the rotatable disc.

12. The waist rotation structure of claim 11, wherein the transmission section is inserted in the first cable insertion hole, a lateral surface of the transmission section comprising a first positioning surface, and a lateral surface of the first cable insertion hole comprising a second positioning surface matching the first positioning surface.

13. The waist rotation structure of claim 12 further comprising an auxiliary disc, wherein the auxiliary disc defines a second cable insertion hole aligning with the through hole, and is fixedly connected to the transmission section.

14. The waist rotation structure of claim 11 further comprising an auxiliary support fixedly connected to the mounting disc, wherein the auxiliary support and the mounting disc corporately define a receiving chamber therebetween, the driving device is received in the receiving chamber, and the auxiliary support defines a limitation groove that allows the driving device to pass therethrough and prevents the driving device from moving.

15. The waist rotation structure of claim 14, wherein the auxiliary support defines a positioning hole, the body further comprises an auxiliary section that is integrally formed with the gear section and passes through the positioning hole and rotatably connected to the auxiliary support, the auxiliary section is connected to the auxiliary support through a second bearing at said positioning hole.

16. The waist rotation structure of claim 10 further comprising an initial position marking assembly for marking an initial position of the rotatable disc, wherein the initial position marking assembly comprises a metal block arranged on a side of the rotatable disc that faces the mounting disc, and a sensor arranged on a side of the mounting disc that faces the rotatable disc, the sensor is configured to detect a presence of the metal block when the metal block rotates together with the rotatable disc to a predetermined position.

17. The waist rotation structure of claim 10 further comprising a stopper assembly, wherein the stopper assembly comprising a stopper arranged on a side of the rotatable disc that faces the mounting disc, and two posts arranged on a side of the mounting disc that faces the rotatable disc, and the two posts are located on a movement path of the stopper, and are spaced apart from each other.

18. The waist rotation structure of claim 10, wherein a ratio of a number of teeth of the driven gear to a number of teeth of the drive gear is greater than one.

* * * * *